United States Patent
Asukabe et al.

(10) Patent No.: US 6,827,986 B2
(45) Date of Patent: Dec. 7, 2004

(54) GRAFTED POLYMER ELECTROLYTE MEMBRANE, METHOD OF PRODUCING A GRAFTED POLYMER ELECTROLYTE MEMBRANE, AND FUEL CELL COMPRISING THE SAME

(75) Inventors: Michio Asukabe, Aichi-ken (JP); Michiaki Kato, Aichi-ken (JP); Takumi Taniguchi, Aichi-ken (JP); Yu Morimoto, Aichi-ken (JP); Masaya Kawasumi, Aichi-ken (JP)

(73) Assignee: Aisin Seiki Kabushiki Kaisha, Kariya (JP)

(*) Notice: Subject to any disclaimer, the term of this patent is extended or adjusted under 35 U.S.C. 154(b) by 133 days.

(21) Appl. No.: 09/784,057

(22) Filed: Feb. 16, 2001

(65) Prior Publication Data

US 2001/0026893 A1 Oct. 4, 2001

(30) Foreign Application Priority Data

Feb. 16, 2000 (JP) ........................................ 2000-038542

(51) Int. Cl.$^7$ .............................. B05D 5/00; B05D 5/12; B05D 3/06; B05D 3/04; C08F 2/00
(52) U.S. Cl. ...................... 427/536; 427/539; 427/551; 427/244; 427/246
(58) Field of Search ................................ 427/491, 536, 427/539, 244, 245, 246, 412.5, 412.3, 551

(56) References Cited

U.S. PATENT DOCUMENTS

| | | | | |
|---|---|---|---|---|
| 4,804,427 A | * | 2/1989 | Paul et al. ................... | 156/181 |
| 5,187,028 A | * | 2/1993 | Rogers et al. ............... | 429/101 |
| 5,203,025 A | * | 4/1993 | Anvari et al. .......... | 210/500.35 |
| 5,213,722 A | * | 5/1993 | Iwasaki et al. .......... | 427/412.3 |
| 5,523,118 A | * | 6/1996 | Williams ..................... | 427/536 |
| 5,691,005 A | * | 11/1997 | Morigaki et al. ........... | 427/536 |
| 5,753,132 A | * | 5/1998 | Shamouilian et al. .......... | 216/33 |
| 5,804,263 A | * | 9/1998 | Goldberg et al. ........... | 427/539 |
| 5,817,718 A | | 10/1998 | Nezu et al. ................... | 525/64 |
| 5,919,570 A | * | 7/1999 | Hostettler et al. ........ | 428/424.8 |
| 5,994,426 A | | 11/1999 | Nezu et al. .................. | 572/125 |
| 6,224,994 B1 | | 5/2001 | Asukabe et al. .............. | 429/33 |
| 6,235,432 B1 | * | 5/2001 | Kono et al. .................. | 429/303 |
| 6,242,123 B1 | | 6/2001 | Nezu et al. .................... | 429/33 |
| 6,368,677 B2 | * | 4/2002 | Hubbard et al. ............. | 427/536 |
| 6,680,144 B2 | * | 1/2004 | Choi ........................... | 429/225 |
| 6,733,847 B2 | * | 5/2004 | Kunz et al. .................. | 427/533 |

FOREIGN PATENT DOCUMENTS

JP 9-102322 4/1997

* cited by examiner

Primary Examiner—Marianne Padgett
(74) Attorney, Agent, or Firm—Oblon, Spivak, McClelland, Maier & Neustadt, P.C.

(57) ABSTRACT

The present invention is a grafted polymer electrolyte membrane prepared by first preparing a precursor membrane comprising a polymer which is capable of being graft polymerized, exposing the surface of the precursor membrane to a plasma in an oxidative atmosphere, then graft-polymerizing a side chain polymer to the plasma treated precursor membrane and introducing a proton conductive functional group to the side chain. The resulting grafted polymer electrolyte membrane has excellent stability and performance when used in a proton-exchange membrane fuel cell or for electrolysis of water.

12 Claims, 2 Drawing Sheets

BASIC STRUCTURE OF PROTON-EXCHANGE MEMBRANE FUEL CELL

GRAFTED POLYMER ELECTROLYTE MEMBRANE, METHOD OF PRODUCING A GRAFTED POLYMER ELECTROLYTE MEMBRANE, AND FUEL CELL COMPRISING THE SAME

BACKGROUND OF THE INVENTION

1. Field of the Invention

The present invention relates to a grafted polymer electrolyte membrane, a method of producing a grafted polymer electrolyte membrane, and a fuel cell comprising a grafted polymer electrolyte membrane. In particular, the grafted polymer electrolyte membrane of the present invention has excellent stability during use and has good adhesion when used as a solid state polymer electrolyte in a fuel cell or water electrolysis cell.

2. Discussion of the Background

Solid state polymer electrolytes are used in electrodialysis cells, diffusion dialysis cells, as cell diaphragms, and for other applications. Solid state polymer electrolytes are solid state polymer materials which have an ion conductive functional group, such as a sulfonic acid group or carboxylic acid group, which bonds strongly with specific ions and selectively transport cations or anions, depending on the nature of the functional group. A solid state polymer electrolyte may be formed into any shape, including particles, fibers, and flat sheet or hollow fiber membranes.

A solid state polymer electrolyte offers many advantages over conventional electrolytes. For example, proton-exchange membrane fuel cells which have solid polymer electrolyte membranes have higher energy output densities (allowing the fuel cell to be smaller and lighter), few or no problems with electrolyte scatter because the electrolyte is a solid, simplified pressure control because of the high resistance of the solid polymer electrolyte to pressure differentials across the electrolyte, reduced corrosion of fuel cell materials—hence greater fuel cell durability—by the solid polymer electrolyte membrane, and the ability to operate the fuel cell at a lower temperature.

The basic operating principals of proton-exchange membrane fuel cells are explained with reference to FIG. 1, which is an embodiment of a grafted polymer electrolyte membrane according to the present invention. A pair of electrodes 12 and 14 are provided on opposite sides, respectively, of a solid state proton-exchange electrolyte membrane 10. The anode or fuel electrode 12 is supplied with a fuel gas composed of pure hydrogen or reformed hydrogen, and the cathode or air electrode 14 is supplied with an oxidizing gas composed of oxygen or air. The following reactions occur at the electrodes, and the resulting movement of protons (hydrogen ions) in the polymer electrolyte membrane generates an electromotive force.

Anode reaction: 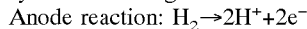
Cathode reaction: 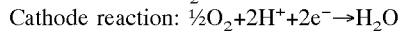

As shown above, water is generated in the cathode reaction. Particularly when the current density of the cell is large, the cathode may become covered with water generated by the cathode reaction (i.e., "flooding"), which interrupts the flow of oxidizing agent (oxygen or air) at the cathode. This flooding phenomenon can therefore degrade fuel cell performance.

Various types of ion exchange membranes, for example polyphenolsulfonic acid membranes, polystyrene sulfonate membranes, and polytrifluorostyrene membranes have been used as proton-conductive solid-state electrolyte membranes. At present, perfluorocarbon membranes are the most commonly used.

Conventional perfluorocarbon membranes have a perfluoroalkylene polymer main chain (or "backbone"), and are not crosslinked. Thus, the side chains of the perfluorocarbon polymer, which contain proton-conductive functional groups, have a relatively high degree of freedom (i.e., are quite mobile). In addition, when such membranes are ionized, the main chain is highly hydrophobic, whereas the proton-conductive side chains are highly hydrophilic. Nafion™ (made by DuPont) is a typical example of such a membrane. Such fluorocarbon membranes have high chemical stability due to their chemical structure (i.e., predominantly C—F bonds), and have therefore been developed for, and studied under severe conditions.

However, fluorocarbon-type polymer electrolyte membrane are difficult and very expensive to make. Thus, fluorocarbon-type polymer electrolyte membranes have been limited in use to special applications such as space or military proton-exchange membrane fuel cells, with the result that fluorocarbon-type polymer electrolyte membranes have not been widely used for non-military applications.

Various attempts have been made to provide solid state polymer electrolyte membranes which have comparable or improved properties compared to fluorocarbon-type polymer electrolyte membranes, and which are also much less expensive to produce. For example, Nezu et al (U.S. Pat. No. 5,994,426, which corresponds to Japanese Laid-open Patent No. Hei. 09(1997)-102322) proposes a sulfonic acid type polystyrene-graft-ethylene-tetrafluoroethylene copolymer membrane (a sulfonic acid type ETFE-g-PSt membrane) which has a main chain composed of a fluorocarbon-type copolymer and a hydrocarbon-type side chain having a sulfonic group. The ETFE-g-PSt membrane is inexpensive to produce, has sufficient strength when fabricated as a thin film, and the electrical conductivity can easily be controlled by adjusting the type and amount of proton-conductive functional group introduced. The ETFE-g-PSt membrane is a useful material which has both high mechanical strength and high electric conductivity, which results from the combination of a side chain polymer having proton-conductive functional group graft-polymerized into to the highly crystalline main chain polymer.

The results of the above studies show that solid state polymer electrolyte membranes have improved properties over conventional electrolyte membranes.

In addition to having high mechanical strength and electrical conductivity, a solid state polymer electrolyte membrane should have high permeability to water and good adhesion at the interface of the electrode and the solid polymer electrolyte membrane. In particular, the fuel cell performance depends largely on how well the solid state polymer electrolyte membrane adheres to the electrode.

The relationship between the adhesion of the solid polymer electrolyte membrane to the electrode, and fuel cell performance is thought to be the following. In addition to the inherent permeability properties of the solid state polymer electrolyte membrane material to water, the interface or boundary layer between the solid state polymer electrolyte membrane and the electrode also affects the mobility of water in the fuel cell. In general, if the polymer of the solid state polymer electrolyte membranes has a strongly hydrophobic main chain, the solid state polymer electrolyte membrane does not adhere well to the electrode, and therefore does not provide a good connection at the interface between the electrode and the solid state polymer electrolyte membrane. The resulting poor connection at the interface between the electrode and the solid state polymer electrolyte membrane causes increased resistance at this interface. As a consequence, the benefits of using a solid state polymer electrolyte membrane cannot be realized (i.e., the ability to use a thinner, higher surface area membrane with low electrical resistance).

In order to avoid such problems, the solid state polymer electrolyte membrane is generally surface treated prior to incorporation into the fuel cell in order to improve adhesion of the solid state polymer electrolyte membrane to the electrode. For example, the surface of the membrane is sand blasted or chemically etched to form fine irregularities in the surface, and to increase the surface area. However, fluorocarbon-type polymer electrolyte membranes are difficult to chemically modify, and therefore it is difficult to improve the adhesion properties of such materials.

In general, solid state polymer electrolyte membranes, when formed by a membrane-forming device, have a thickness which ranges from 100 to 200 μm. However, conventional methods of making such thin membranes results in thin films of uneven thickness. This uneven thickness can also cause poor contact between the electrode and the surface of the electrolyte membrane, thereby increasing the electrical resistance of the cell where the membrane film is thicker. In addition, mass production lowers the efficiency and increases the cost of solid state polymer electrolyte membranes. Thus, reducing the boundary resistance at the electrode/polymer electrolyte-membrane interface is essential to increasing the performance of proton-exchange membrane fuel cells.

In order to avoid such problems, Japanese Laid-open Patent No. Hei. 4(1992)-220957 describes an improved method for increasing fuel cell performance and adhesion of the electrolyte membrane, in which a solid state polymer electrolyte membrane is plasma treated, to provide a thinner film with even thickness and a rough surface. The plasma treated membrane has a larger surface area for contacting the electrode, resulting in a solid state polymer electrolyte membrane fuel cell which has lower internal resistance.

In addition, Japanese Laid-open Patent No. Hei.5 (1993)-258756 describes a technique for increasing the fuel cell performance, wherein the surface of a roughened solid state polymer electrolyte membrane is sputtered coated with a metal layer which provides more reaction sites.

However, if the above-described hydrocarbon electrolyte membrane or fluorocarbon-type electrolyte membranes are plasma treated in oxidative atmosphere, employing the method described in Japanese Laid-open Patent No. Hei. 4(1992)-220957, the proton-conducting functional groups (i.e., sulfonic acid or carboxylic acid groups) are also oxidized. Since the proton-conducting functional groups play an important role in the diffusion of oxygen and water in the fuel cell, oxidation of these functional groups unavoidably lowers the performance of the fuel cell.

In addition, if the surface of the membrane is roughened by plasma treatment and then sputter coated with metal, as described in Japanese Laid-open Patent No. Hei.5 (1993)-258756, the thermal damage to the surface of the membrane resulting from the plasma treatment is greater than expected. Even though the electric conductivity is improved by the sputter coated metal layer at the interface between the membrane and the electrode, the production cost of such fuel cells is high. Thus, it difficult to obtain good fuel cell performance at low cost.

Thus, there is a need for an electrolyte membrane, and methods for producing them, in which inherently hydrophobic polymers, which are therefore less adhesive than other polymers, are provided with improved adhesion. Fuel cells containing such polymer electrolyte membranes should have lower electrical resistance at the interface between the electrode and the membrane, which thereby reduces flooding, and provides excellent operating stability. Thus, ultimately, the present invention is directed to providing improved fuel cells, so that fuel cells can be used in new applications such as electric vehicles.

SUMMARY OF THE INVENTION

It is therefore a primary object of the present invention to provide a solid polymer electrolyte fuel cell which meets such a need.

In order to attain this object, the electrolyte membrane of the present invention comprises:

a precursor membrane which is capable of being graft polymerized, which is pre-treated by plasma treatment in an oxidative atmosphere;

a side chain polymer is then graft-polymerized to the precursor membrane; and a proton conductive functional group is introduced to the side chain polymer.

BRIEF DESCRIPTION OF THE DRAWINGS

These and other features and advantages of the present invention will be more readily understood from the following detailed description of the invention, and the Figures.

DETAILED DESCRIPTION OF THE INVENTION

Figure 1:
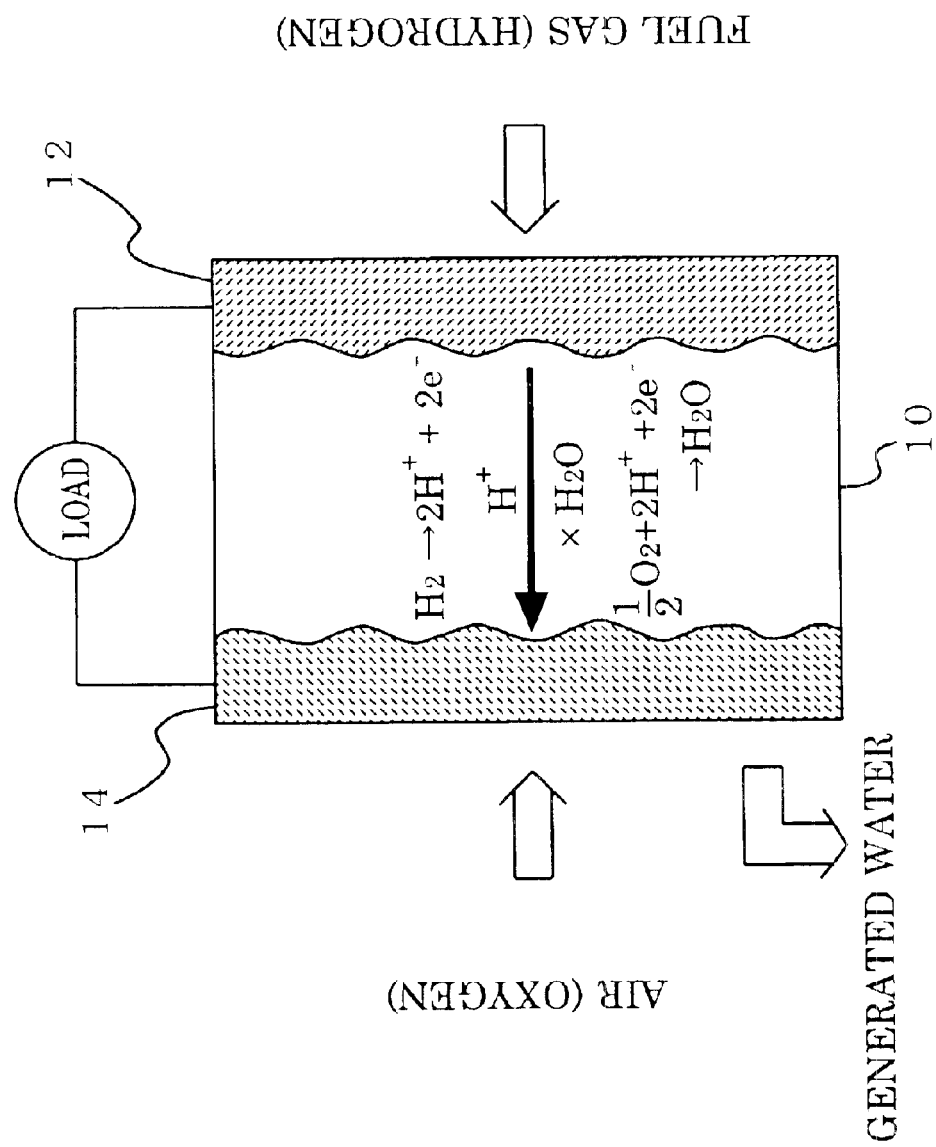
FIG. 1 is a side cross-sectional view of a solid polymer electrolyte fuel cell which has the electrolyte membrane of the present invention.

The precursor membrane may be formed from any polymer or copolymer, for example, polyethylene, polypropylene, polyvinylchloride, polyvinylidenedichloride, polyvinylfluoride (PVF), polyvinylidenedifluoride (PVDF), polytetrafluoroethylene, ethylene-tetrafluoroethylene copolymer, tetrafluoroethylene-perfluoroalkylvinylether copolymer, and tetrafluoroethylene-hexafluoropropylene copolymer.

The side chain polymer may be any hydrocarbon polymer which contains a proton conductive functional group or which may be modified to provide a proton conductive functional group. The side chain polymer may be, for example, poly(chloroalkyl styrene), poly(α-methyl styrene), poly(α-fluorostyrene), poly(p-chloromethyl styrene), polystyrene, polyacrylic acid, polymethacrylic acid, poly (vinyl alkyl sulfonic acid), and copolymers thereof.

Sulfonic acid groups are preferred as the proton conductive functional group.

In addition, when the surface of the precursor membrane is exposed to the plasma, oxygen gas is the preferred plasma gas. The oxygen plasma gas is strongly oxidizing and enlarges or expands the contact area of the surface of the precursor membrane when etched to provide an irregular or rough surface. In addition, the plasma treatment may generate hydrophilic groups such as carbonyl groups ($C=O$) or hydroxyl groups ($C-OH$) on the surface of the membrane, which may increase the adhesion of the membrane surface.

Thus, in the present invention, the surface of the precursor membrane is transformed from a hydrophobic surface to a more hydrophilic surface by the oxidizing conditions of the plasma treatment. Thereafter, the surface of the precursor membrane is graft-polymerized with a side chain polymer comprising a hydrocarbon polymer which either has a proton conductive functional group, or to which a proton conductive functional group can be introduced, thereby increasing the hydrophilicity and the adhesiveness of the membrane surface and providing an electrolyte membrane with excellent electrical conductivity. In addition, this electrolyte membrane adheres well to electrodes, providing a good connection at the interface. As a consequence, the resulting electrode-electrolyte structure overcomes problems associated with increased resistance to the transport of water between the electrode and the electrolyte membrane. It is therefore easier to introduce humidifying water and to remove water generated during use from fuel cells employing this electrolyte membrane. The electrolyte membranes of the present invention also have excellent stability during operation of the fuel cell.

Having generally described this invention, a further understanding can be obtained by reference to certain specific examples which are provided herein for purposes of illustration only, and are not intended to be limiting unless otherwise specified.

First Embodiment

An ethylene-tetrafluoroethylene copolymer precursor membrane (ETFE membrane) was exposed to a plasma under an oxidizing atmosphere, then graft-polymerized with polystyrene to produce a polystyrene-graft-ethylene-tetrafluoroethylene copolymer membrane (ETFE-g-PSt membrane). A sulfonic acid group was then introduced into the polystyrene side chain to provide a sulfonic-group-introduced sulfonic acid type ETFE-g-PSt electrolyte membrane.

The detailed process for producing the sulfonic acid type ETFE-g-PSt electrolyte membrane of the First Embodiment is as follows. An ETFE membrane having a thickness of 100 μm and dimensions of 100 mm×100 mm was exposed to a plasma in an oxidative atmosphere in a plasma reactor provided by Yamato Kagaku Co. Ltd. The plasma treatment conditions were as follows: ambient gas composition—argon:oxygen=75:25, gas flow rate—90 ml/min, output—30 W, and process time—20 seconds. The resulting plasma treated ETFE membrane was then cooled with dry ice and maintained at a cooled temperature. The cooled ETFE membrane was then irradiated with a high energy electron beam at 2 MeV and 20 kGy to produce radicals in the ETFE membrane. The irradiated ETFE membrane was then warmed to room temperature, and immediately immersed in an excess amount of styrene monomer in a nitrogen purged reaction vessel. The membrane and styrene monomer mixture was then warmed at 60° C. for about 60 hours to allow polystyrene chains to graft to the ETFE. The grafted ETFE membrane was then exposed to refluxing chloroform to remove ungrafted components such as styrene monomer and styrene homopolymer, and dried in vacuo at 80° C., thereby providing the ETFE-g-PSt membrane.

Next, the ETFE-g-PSt membrane was immersed for about an hour in a room temperature solution of 30 parts by weight of chlorosulfonic acid and 70 parts by weight of tetrachloroethane, thereby introducing sulfonyl chloride groups into the styrene side chains of the ETFE-g-PSt membrane. The ETFE-g-PSt membrane was then washed with ethanol to remove the unreacted components therefrom, thereby providing an ETFE-g-PSt membrane to which sulfonyl chloride groups had been introduced.

The resulting ETFE-g-PSt membrane containing sulfonyl chloride groups was then contacted with a refluxing 1N solution of potassium hydroxide for about an hour, to hydrolyze the sulfonyl chloride group, then contacted with refluxing 1N sulfuric acid for about an hour. Finally, the resulting ETFE-g-PSt membrane was washed with distilled water and dried in vacuo at 80° C. to provide a sulfonic acid type ETFE-g-PSt electrolyte membrane. This is the First Embodiment of the present invention.

COMPARATIVE EXAMPLE 1

A sulfonic acid type ETFE-g-PSt electrolyte membrane was produced according to the method of the First Embodiment, described above, except that the ETFE precursor membrane of Comparative Example 1 was not plasma treated.

Second Embodiment

The sulfonic acid type PVDF-g-PSt electrolyte membrane of the Second Embodiment was produced according to the method described in the First Embodiment, above, except that the precursor membrane was a polyvinylidenedifluoride membrane (PVDF membrane) rather than an ETFE membrane. The PVDF membrane of the Second Embodiment was plasma treated under oxidizing conditions, graft-polymerized with polystyrene, then sulfonic acid groups were introduced therein, as described above.

The detailed process of producing the sulfonic acid type PVDF-g-PSt electrolyte membrane of the Second Embodiment is as follows. A PVDF membrane having a thickness of 100 μm and dimensions of 100 mm×100 mm was exposed to a plasma in an oxidative atmosphere using a plasma reactor provided by Yamato Kagaku Co. Ltd. The plasma treatment conditions were as follows: ambient gas composition—argon:oxygen=75:25, gas flow rate—90 ml/min, output—30 W, and process time—20 seconds. The resulting PVDF membrane was cooled down and maintained at a low temperature using dry ice. The PVDF membrane was then irradiated with a high energy electron beam at 2 MeV and 20 kGy to produce radicals in the PVDF membrane. The PVDF membrane was then warmed to room temperature, and immediately immersed in an excess amount of styrene monomer in a nitrogen purged reaction vessel. The mixture of membrane and styrene was then warmed to 60° C. for 60 hours to allow the styrene to graft to the PVDF. The ungrafted components, such as styrene monomer and styrene homopolymer where then removed by contacting the grafted PVDF membrane with refluxing chloroform. The membranes was then dried in vacuo, at a temperature of 80° C., thereby providing a PVDF-g-PSt membrane.

The PVDF-g-PSt membrane was then immersed in a solution of 30 parts by weight of chlorosulfonic acid and 70 parts by weight of tetrachloroethane for about an hour at a room temperature to introduce sulfonyl chloride groups into the polystyrene side chains of the PVDF-g-PSt membrane. The PVDF-g-PSt membrane was then washed with ethanol to remove unreacted components therefrom, thereby providing a PVDF-g-PSt membrane into which sulfonyl chloride groups had been introduced.

The PVDF-g-PSt membrane containing sulfonyl chloride groups was then contacted with a refluxing 1N solution of potassium hydroxide for about an hour to hydrolyze the sulfonyl chloride groups, then contacted with 1N refluxing sulfuric acid for about an hour. The resulting PVDF-g-PSt electrolyte membrane was then washed with distilled water and dried in vacuo at 80° C. to provide a sulfonic acid type PVDF-g-PSt electrolyte membrane. This is the Second Embodiment of the present invention.

COMPARATIVE EXAMPLE 2

A sulfonic acid type PVDF-g-PSt electrolyte membrane was produced using the method of the Second Embodiment, except that the precursor PVDF membrane of Comparative Example 2 was not plasma treated.

The electrolyte membranes described above were evaluated based on the measured rate of grafting and electrical conductivity.

The amount of grafting of each of the electrolyte membranes described above is calculated according the following formula (2).

$$\text{amount of grafting } (\%) = (W_{ETFE\text{-}g\text{-}PSt} - W_{ETFE}) \times 100 / W_{ETFE} \quad \text{formula (2)}$$

where $W_{ETFE\text{-}g\text{-}PSt}$ is the weight of the membrane after the graft polymerization reaction, and $W_{ETFE}$ is the weight of the membrane before the graft polymerization reaction.

The method for measuring the electrical conductivity of each of the electrolyte membranes described is as follows. After being immersed in distilled water at a room temperature, each of the electrolyte membranes was cut into a 1-cm wide pieces and attached to two terminals of an electrical conductivity measuring cell. In order to provide a good electrical contact between each of the terminals and the corresponding portions of the electrolyte membrane, the terminal was formed from a platinum foil galvanized with platinum-chrome. The electrical conductivity measuring cell was then immersed in distilled water maintained at 25° C. to measure the membrane electric resistance with AC anodizing at 10 kHz, using an LCR meter made by YHP (production code 4262A-LCR-Meter). The electrical conductivity (σ), was calculated using the following formula (3).

$$\sigma = L/(R \times S) \quad \text{Formula (3)}$$

where σ: electric conductivity (S/cm)
R: resistance (Ω)
S: cross-sectional area (cm²)
L: distance between terminals (cm).

The amount of grafting and electrical conductivity of each of the electrolyte membranes are listed in the following Table 1.

TABLE 1

|  | Amount of Grafting (%) | Electrical Conductivity (S/cm) |
|---|---|---|
| First Embodiment | 48 | 0.090 |
| Comparative Example 1 | 50 | 0.095 |
| Second Embodiment | 65 | 0.110 |
| Comparative Example 2 | 66 | 0.105 |

The membrane of the First Embodiment and that of Comparative Example 1 in Table 1, both have substantially the same amount of grafting and electrical conductivity irrespective of whether or not the precursor polymer membrane (i.e., ETFE membrane) was plasma treated. In addition, the membrane of the Second Embodiment and that of Comparative Example 2, which was based on a different precursor polymer membrane (i.e., PVDF membrane) also show substantially the same amount of grafting and electrical conductivity. In other words, substantially the same electrolyte membrane composition, having essentially the same electrical conductivity was produced, independently of whether or not the precursor membranes was plasma treated.

If an electrolyte membrane is exposed to an oxidative plasma according to the technique of Japanese laid-open Patent No. Hei.04-220957, the proton-conductive functional groups in the surface of the electrolyte membrane become oxidized. In the present invention, however, the surface of the precursor polymer membrane is exposed to the oxidative plasma before the resulting membrane is graft-polymerized with a hydrocarbon polymer into which the proton-conductive functional groups are introduced, or which already contain a proton-conductive functional group, so that the proton-conductive functional groups are not oxidized. Thus, the present invention provides surface treated solid state electrolyte membranes which have substantially same composition and performance as electrolyte membranes which have not been surface treated.

In order to evaluate the nature of the bonding between the electrode and the electrolyte, electrode/membrane assemblies were prepared using each of the electrolyte membranes described above. The evaluation of the bonding between the membrane and the electrode was used as a basis for evaluating the performance of fuel cells as described below. The electrode/membrane assemblies were prepared as follows. First, platinum loaded carbon (60 wt % platinum) was dispersed in a solution of a commercially available fluorocarbon-based proton exchange resin(Nafion™, Du Pont) and the resulting solution was printed on a diffusion layer made of carbon-cloth-made to provide an electrode. Thereafter, the resultant electrode was hot pressed with each of the electrolyte membranes described above (i.e., the electrolyte membranes according to the First Embodiment, Comparative Example 1, the Second Embodiment, and Comparative Example 2) at a pressure of 5 MPa and a temperature of 120° C., thereby producing the respective electrode/membrane assemblies.

Fuel cells containing these electrode/membrane assemblies were evaluated at a cell temperature of 80° C. under conditions such that the relative amount of air, the air pressure, and humidification temperature at the air electrode side are 4.0, 1.5 atm, and 70° C., respectively, while the relative amount of hydrogen, hydrogen pressure, and humidification temperature at the hydrogen electrode side are 1.6, 1.5 atm, and 85° C., respectively. The fuel cells were evaluated based on their current-voltage characteristics and starting properties. The current-voltage characteristics measure the ability of the electrode/membrane assemblies to resist flooding. The stability of the fuel cell during operation is measured by the amount of time period to establish a stable output voltage at a current density of 0.7 A/cm² after the fuel cell is first turned on.

Figure 2:
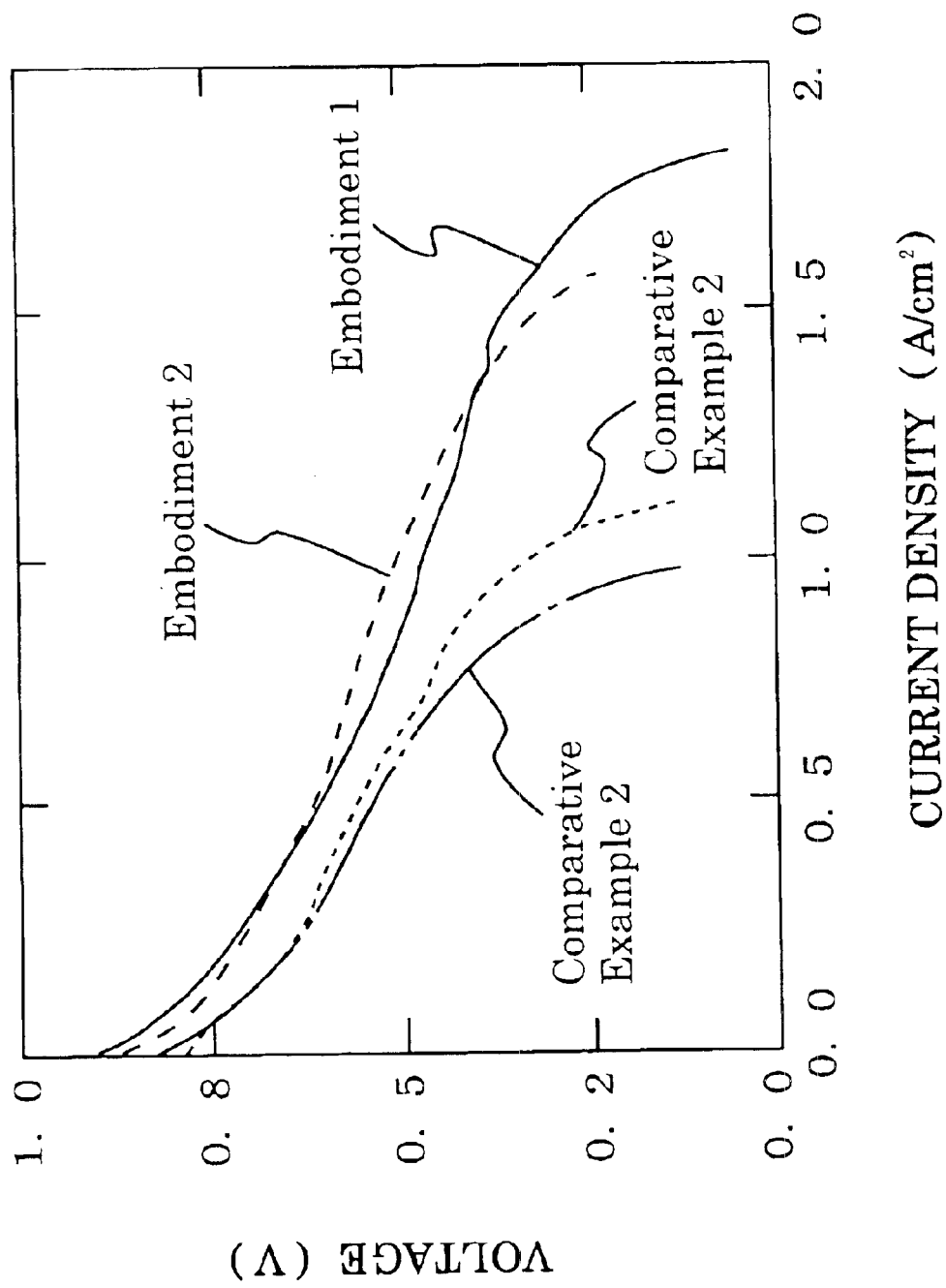
FIG. 2 is a graph of voltage versus current density which compares various embodiments of the present invention with comparative examples.

FIG. 2 is a graph which shows the current-voltage characteristic of each of the electrode/membrane connectors. Even at a glance, the data of FIG. 2 show that the electrolyte membrane of the First Embodiment (i.e., ETFE membrane) and the Second Embodiment (i.e., PVDF membrane) are capable of functioning at a higher current than are the membranes of the comparative examples, which are not plasma treated.

In addition, Table 2, below, shows the time period required by fuel cells to achieve a steady state output voltage at a current density of 0.7 A/cm², and the voltage measured at that steady state.

TABLE 2

THE TIME REQUIRED FOR A FUEL CELL TO ATTAIN A STEADY STATE & VOLTAGE THEREAT

| Electrolyte Membrane | Time Period (Minute) | Voltage (Volt) |
|---|---|---|
| First Embodiment | 3 | 0.75 |
| Comparative Example 1 | 20 | 0.73 |
| Second Embodiment | 7 | 0.65 |
| Comparative Example 2 | 30 | 0.65 |

Table 2 shows that in comparison to Comparative Examples 1 and 2, the time required for fuel cells containing electrolyte membranes according to the First and Second Embodiments of the present invention to achieve a steady state voltage output is substantially shorter. This is believed to be because the fuel cells containing electrolyte membranes according to the present invention are free from flooding, which allows the fuel cell to operate in a stable fashion.

Electrolyte membranes such as the sulfonic acid group ETFE-g-PSt electrolyte membrane or sulfonic acid group PVDF-g-PSt electrolyte membrane of the present invention are made up of a hydrophilic portion (i.e. a sulfonated polystyrene) which has excellent adhesion to the electrode, and a hydrophobic portion (i.e. the ETFE of the precursor polymer of the First Embodiment/or the PVDF of the precursor polymer of the Second Embodiment) which has poor adhesion to the electrode. Because the surface of the hydrophobic portion is exposed to an oxidative plasma, the surface of the hydrophobic portion becomes more hydrophilic (i.e., because of the generation of hydrophilic carbonyl (C=O) or hydroxyl groups (C—OH)), which results in better adhesion at the interface between the electrode and membranes.

In addition, it may also be that the hydrophilic groups on the surface of the electrolyte membrane play an important role in absorbing liquid phase water into the electrolyte membrane after water vapor reaches the surface of the electrolyte membrane or in forming water vapor when the liquid water in the electrolyte membrane diffuses outside of the electrolyte membrane, although such details are not obvious. Thus, plasma treating the precursor membrane to prepare the electrolyte membrane of the present invention shortens the time required for a fuel cell to attain steady state operation and to prevent the possibility of fuel cell failure due to flooding.

After plasma pretreatment, the introduction of proton conductive groups into the grafted side chain polymers by increasing the amount of grafting makes it possible to obtain higher electrical conductivity electrolyte membranes which have remarkably improved adhesion to electrodes.

ADVANTAGES OF THE INVENTION

An electrolyte membrane of the present invention is prepared by pretreating a precursor membrane, which is capable of being graft polymerized with a side chain, in an oxidative atmosphere, then graft-polymerizing a side chain polymer to the precursor membrane. A proton conductive functional group is then introduced to the precursor membrane by adding the functional group to the side chain polymer. Alternatively, the functional group may already be present on monomers composing the side chain polymer, prior to grafting. The resulting electrolyte membranes have excellent electrical conductivity and good adhesion to other materials. The surface of the electrolyte membrane is thought to contain hydrophilic groups such as carbonyl groups (C=O) or hydroxyl groups (C—OH), generated during plasma treatment of the precursor membrane, thereby improving the adhesion. The proton conductive functional group is not oxidized by the plasma treatment, as in conventional membranes, because they are introduced after the plasma treatment, and therefore the electrical conductivity remains unspoiled. When electrolyte membranes according to the present invention are used in fuel cells, water vapor from humidification readily enters the electrolyte membrane, and conversely, water generated from operation of the fuel cell is readily removed, thereby reducing flooding. The electrolyte membranes therefore have excellent stability in operation. Thus, the performance of the fuel cell can be drastically improved, accelerating the application of fuel cells to the field of electrically-operated vehicle, and thereby increasing the economic benefits of the fuel cell.

The priority document of the present application, Japanese patent application 2000-038542 filed Feb. 16, 2000, is incorporated herein by reference.

Obviously, numerous modifications and variations on the present invention are possible in light of the above teachings. It is therefore to be understood that within the scope of the appended claims, the invention may be practiced otherwise than as specifically described herein.

What is claimed as new and is intended to be secured by Letters Patent is:

1. A method of producing an electrolyte membrane comprising:

providing a precursor membrane comprising a polymer which is capable of being graft polymerized;

exposing the surface of the precursor membrane to a plasma in an oxidative atmosphere to generate surface carbonyl groups, surface hydroxyl groups, or surface carbonyl groups and surface hydroxyl groups;

graft-polymerizing a side chain polymer to the plasma treated precursor membrane; and introducing a proton conductive functional group to the side chain polymer;

wherein said graft polymerizing a side chain polymer to the plasma treated precursor membrane and said introducing a proton conductive functional group to the side chain polymer leave at least some of said plasma-generated surface carbonyl groups, surface hydroxyl groups, or surface carbonyl groups and surface hydroxyl groups, on the surface of the electrolyte membrane.

2. The method of claim 1, wherein the polymer is at least one polymer selected from the group consisting of polyethylene, polypropylene, polyvinylchloride, polyvinylidenedichloride, polyvinylfluoride, polyvinylidenedifluoride, polytetratfluoroethylene, ethylene-tetrafluoroethylene copolymer, tetrafluoroethylene-perfluoroalkylvinylether copolymer, and tetrafluoroethylene-hexafluoropropylene copolymer.

3. The method of claim 1, wherein the side chain polymer is a hydrocarbon polymer to which at least one proton conductive group can be introduced.

4. The method of claim 3, wherein the hydrocarbon polymer is at least one hydrocarbon polymer selected from the group consisting of poly(chloroalkyl styrene), poly($\alpha$-methyl styrene), poly($\alpha$-fluorostyrene), poly(p-chloromethyl styrene), polystyrene, and copolymers thereof.

5. The method of claim 1, wherein the proton conductive functional group is a sulfonic acid group.

6. The method of claim 2, wherein the proton conductive functional group is a sulfonic acid group.

7. The method of claim 4, wherein the proton conductive functional group is a sulfonic acid group.

8. The method of claim 1, wherein said oxidative atmosphere comprises oxygen.

9. The method of claim 1, wherein the precursor membrane comprises an ethylene-tetrafluoroethylene copolymer, the side chain polymer comprises polystyrene, and the proton conductive functional group is sulfonic acid.

10. The method of claim 1, wherein the ratio of argon to oxygen is 75 to 25.

11. The method of claim 1, wherein said graft-polymerizing a side chain polymer to the plasma treated precursor membrane is accomplished by irradiating said plasma treated precursor membrane with an electron beam and exposing the irradiated plasma treated precursor membrane to a side chain polymer.

12. The method of claim 11, wherein the precursor membrane comprises an ethylene-tetrafluoroethylene copolymer, the side chain polymer comprises polystyrene, and the proton conductive functional group is sulfonic acid.

* * * * *